Aug. 17, 1965 E. AHRENS 3,201,527

PHONOGRAPH PICKUP FOR GROOVED RECORDS

Filed Oct. 29, 1958 2 Sheets-Sheet 1

PHONOGRAPH PICKUP FOR GROOVED RECORDS

Filed Oct. 29, 1958

United States Patent Office 3,201,527

Patented Aug. 17, 1965

3,201,527

PHONOGRAPH PICKUP FOR GROOVED RECORDS

Erhard Ahrens, Kiel, Schleswig-Holstein, Germany, assignor to Electroacustic Gesellschaft mit beschränkter Haftung, Kiel, Germany, a corporation of Germany Filed Oct. 29, 1958, Ser. No. 770,411

Claims priority, application Germany, Mar. 8, 1958, E 15,494

14 Claims. (Cl. 179—100.41)

My invention relates to phonograph pickups for grooved records and, in a preferred aspect, to pickups suitable for monophonic as well as stereophonic sound tracks. Such stereo pickups have a stylus engageable with the record groove and operatively joined with two transducers which translate the sound-responsive stylus oscillations into electric voltages. The two sound tracks of the stereophonic records for which such a pickup is suitable may be of the hill-and-dale type and the lateral type respectively, or both tracks may be lateral and be located along the inclined side walls of the groove.

It is an object of my invention to provide a pickup of the above-mentioned type whose oscillatable stylus assembly is readily exchangeable in a pivot mounting of simple design yet is capable of elastic deflection in all directions of a vertical plane for coaction with one or more transducers. More specifically, it is an object to provide a stereophonic pickup of simple design that permits inserting and removing the oscillatable stylus assembly by plugging it axially into a socket opening while also securing an isotropic or universal-motion deflection of the stylus. Still another object is to improve the reproducing quality of a stereophonic pickup by preventing edging motion of the stylus carrier about its axis without detriment to the desired isotropic or universal deflectability, and by permitting the stylus arm of the assembly to transmit only bending action but no torque from the stylus to the transducers. It is also an object to securely prevent impairment of reproduction due to mechanical resonance in the pickup.

According to one of the features of my invention the phonograph pickup is provided with an elongated stylus member which extends essentially symmetrically to its longitudinal axis over a predominant portion of its length. The rod-shaped stylus arm carries a rigidly attached stylus at one end, whereas the other end is attached to, preferably plugged into, a mounting structure. Furthermore, the stylus end is deflectable, together with the arm, from a normal position in any and all directions within a plane perpendicular to the connecting line between the pivot center or area of the deflection and the tip of the stylus. The stylus arm is preferably given smallest feasible mass and for that reason may be made of light metal such as aluminum.

According to a more specific feature of the invention, the mounting structure for attaching the rod-shaped stylus arm to a supporting structure or housing of the pickup is designed as a universal or cardanic joint, preferably consisting of a ring or grommet of natural or synthetic rubber. According to another feature of the invention, however, the rod-shaped stylus arm has its rear end rigidly clamped in the supporting structure or housing of the pickup and an axially limited portion of the arm immediately adjacent to the clamping point is made elastic, for example by giving it a constricted cross section, thus providing for the above-mentioned isotropic mobility of the stylus tip. Such a rod-shaped stylus arm clamped or plugged-in longitudinally affords a particular ease of exchanging the stylus arm simply by pulling it axially out of its seat and then inserting the replacement arm by pushing it into the seat. The rod-shaped and substantially straight design of the elongated arm contributes to facilitating such an exchange.

A pickup according to the invention may be provided with two electromagnetic, electrodynamic, or electrostrictive transducers whose respective main orientations are perpendicular to each other. The "main orientation" is the one direction in which a force or motion acting from the stylus upon the transducer produces in the transducer a maximum amount of voltage. In other words, the "main orientation" is the one direction in which the transducer is most sensitive. Instead of providing two individual transducers, each may be constituted by a group of individual transducer elements, the two groups having the same number of such elements, and the elements in each group being connected with each other in cumulative voltage relation. While as mentioned, the transducers may be electromagnetic or electrodynamic, the invention will be more fully described below with reference to electrostrictive transducers.

The transducers, according to another feature of my invention, are coupled with the stylus arm at a location close to the pivot point of universal deflection and remote from the stylus tip for actuation of the transducers by step-down leverage. Furthermore, the main orientation of the transducers is parallel to the direction of the undulations that form the two respective sound tracks so that the voltages issued by the respective transducers are proportional to the main component of motion or velocity of the stylus tip in the directions of the respective undulations.

The transmission of the arm deflection onto the transducers preferably the above-mentioned electrostrictive transducers, is effective through rigid or elastic coupling parts. However, the stylus arm may also be connected with magnetically conducting or magnetized parts of which a portion is freely movable in an air gap between the pole ends of one of two magnetic circuits, as is described and illustrated in my copending application Serial No. 768,785, filed October 21, 1958. Also in accordance with the copending application, the stylus arm itself may be designed as a component of a magnetic circuit and thus may consist of magnetically conducting or permanently magnetized material, and is located in the air gap between the pole ends of the magnetic circuits. In electrodynamic pickups, the stylus arm mounted and pivoted in accordance with the invention may also be connected with induction coils which are freely movable within a magnetic field so as to generate pickup voltage due to their movements.

According to a particularly advantageous embodiment of the invention, the rod-shaped stylus arm is mounted rigidly or elastically in the supporting structure or housing of the pickup and is so designed that preferred local portions of the arm have slight resistance to bending in one direction but much greater resistance to bending in the other direction. For stereophonic use, two such portions bendable in directtions perpendicular to each other are provided, one behind the other in the axial direction of the pickup arm. Electrostrictive transducer elements are mounted on the bendable portions preferably by cementing the elements thereupon. As a result, a particularly simple pickup for stereophonic reproduction is obtained.

It is further of advantage to give the rod-shaped stylus arm a tapering shape at its free end where the stylus proper, such as a sapphire or diamond stylus, is mounted. The tapering may be such that the resistance to bending remains constant along the tapered portion. The tapering end, preferably, extends away from the symmetry axis of the rod-shaped stylus arm so that the tip of the stylus is located on that axis. Such a design of the stylus assembly, in conjunction with its universal-point mounting, providing a universal pivot point substantially on the longitudinal symmetry axis of the arm, avoids any edging of the stylus so that no torques but only bending moments can be transmitted from the stylus through the stylus arm to the transducers. This secures a particularly good reproducing quality of the pickup.

The foregoing and more specific objects and features of my invention, said features being set forth with particularity in the claims annexed hereto, will be apparent from, and will be mentioned in, the following, in conjunction with the drawings, in which:

FIG. 1 is a partly sectional side view of a stereo pickup according to the invention provided with two electrostrictive transducer elements of the bender type, FIG. 2 is a separate side view of the stylus arm and the stylus mounted thereon, and FIG. 3 is a front view of a coupler which forms part of the pickup shown in FIG. 1.

FIGS. 4 and 4*a* are schematical diagrams for explaining the meaning of the term "main orientation" as used in this specification.

FIGS. 8 and 9 illustrate still another embodiment, FIG. 8 being a cross section along the line VIII—VIII in FIG. 9, while FIG. 9 is a longitudinal section along the vertical plane indicated by the line IX—IX in FIG. 8.

All illustrations are on enlarged scale.

Figures 1, 2, 3, 4, 4A:
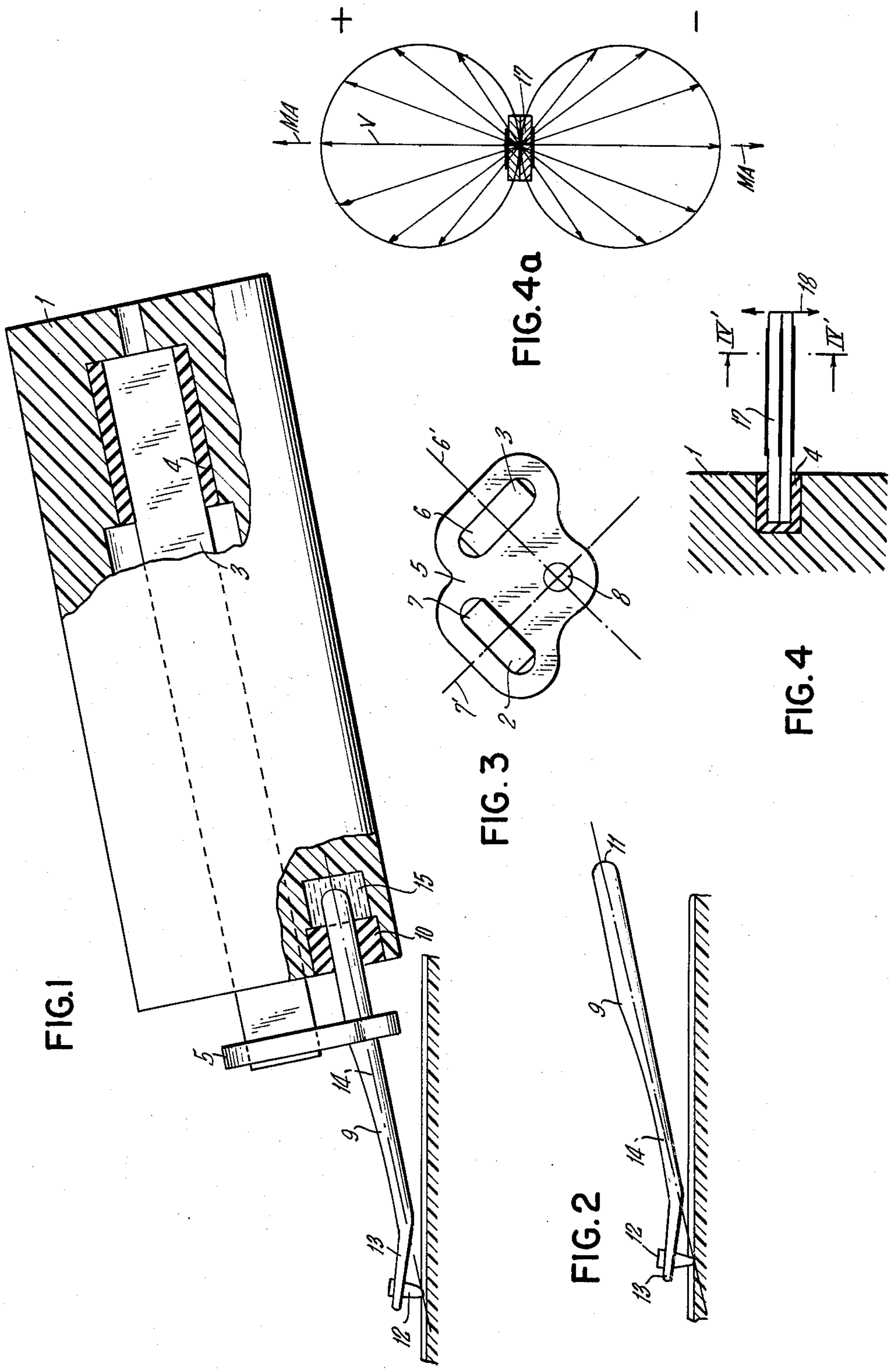

In the pickup illustrated in FIGS. 1, 2 and 3, the supporting structure 1 forms a housing and consists of insulating material. Mounted in the housing are two electrostrictive transducer elements 2 and 3 whose inner end is clamped by means of an inset 4 of elastic material.

The transducer elements may consist of Rochelle salt crystals or of barium titanate or other piezoelectric material. They have the shape of flat and elongated strips. Shoved over the free end of both transducer elements 2 and 3 is a coupler 5 consisting of a flat plate of insulating material. The coupler plate 5 has two elongated openings 6 and 7 which engage the ends of the respective transducer elements. The elongated openings extend at a right angle to each other and are both 45° inclined toward the horizontal. The coupler plate 5 has a bore 8 whose center coincides with the intersection of the two transversal symmetry axes 6' and 7' of the two elongated holes 6 and 7 and hence of the respective transducer elements 3 and 2.

The stylus arm 9 consists essentially of an elongated rod of light metal. It passes through the bore 8 of the coupler 5 and through the center hole of a rubber grommet 10 inserted into a cavity of the housing structure 1. The rear end portion of the arm 11 has constant thickness or diameter over approximately one-third of the total length of the arm. The rear surface 11 is rounded to facilitate plugging the arm into the grommet 10. Counting from the rear end 11, the stylus arm commences to taper at a point located approximately one-third of the total length away from the rear end. The slightly tapering portion, still extending along the longitudinal symmetry axis 14, merges with an end portion which is slightly bent away from the axis 14 and carries the stylus 12. The shape and length of the bent portion 13 are such that the tip of the stylus 12 just touches the symmetry axis 14.

The stylus arm 9 passes entirely through the grommet 10 and protrudes into a cavity 15 which, for mechanically damping any resonance of the stylus assembly, is preferably filled with fluid damping medium such as silicone paste.

In the illustrated embodiment the coupler plate 5 is joined with the stylus arm 9 in bore 8 in substantially rigid fashion. However, if desired, an elastic sleeve may be mounted in bore 8 to provide for elastic coupling. The circular bore 8 may further be replaced by a recess which extends downwardly to the edge of the plate 5 so that the stylus arm can be inserted from below by pushing it upward into the bight of the recess. The seating of the stylus arm 9 either in bore 8 or in grommet 10 or in both, is sufficiently tight to prevent inadvertent turning of the stylus arm about its longitudinal axis 14 under the slight forces imposed upon it during operation of the pickup. However, the stylus arm 9 may also be given a slightly flattened cross section at the location where it engages either the grommet 10 or the bore 8 to facilitate properly orienting the stylus 12 and more securely preventing undesired turning motion about the axis 14.

The free ends of the transducer elements 2 and 3 may be joined with the coupler plate 5 by a sliding fit, or the coupling at this location may be made elastic by inserting a sleeve of rubber between the transducer ends and the respective longitudinal holes 6, 7. Instead of thus providing separate bodies of elastic material for obtaining an elastic coupling, the coupler plate 5 may be made of a synthetic material which has sufficient elasticity in the areas around the holes 6, 7.

The transducer elements 2 and 3 are so mounted, either in the clamping member 4 or at the coupler plate 5, that the ends of the elements 2, 3 engaged by the coupler can freely follow the motion of the coupler occurring during the scanning of a sound-track groove by the stylus.

The operation of the above-described pickup for stereophonic reproduction is as follows:

When the stylus 12, travelling in the groove of a record disc, deflects upwardly to the left along the direction of main orientation, denoted in FIG. 3 by 7', the transducer element 2 is subjected to bending and issues a corresponding pickup voltage. The other transducer element 3, being stressed in the same direction, is substantially rigid in this particular direction so that its deformation is negligible and no voltage is generated. When the stylus 12 deflects essentially in the other direction of main orientation, indicated by 6' in FIG. 3, the transducer element 3 is subjected to bending and issues pickup voltages, whereas the transducer element 2 is stressed only in the direction of its least sensitivity and remains electrically inactive.

The foregoing will be more fully understood from the following with reference to FIGS. 4 and 4*a* showing a piezoelectric transducer element 17 which has one end clamped at 4 in a supporting structure 1 while the other free end is subjected to an alternating force in the direction represented by a double-headed arrow 18. The voltage produced by such alternating force is entered in the diagram of FIG. 4*a* in the vertical direction upon the cross section of the transducer element 17. When the alternating force is accurately vertical, a maximum amount of voltage V is produced in the transducer element. Therefore, this vertical direction is the main orientation of the transducer element. In the case here under observation this main orientation is perpendicular to the longest edge of the transducer cross section.

Figure 5:
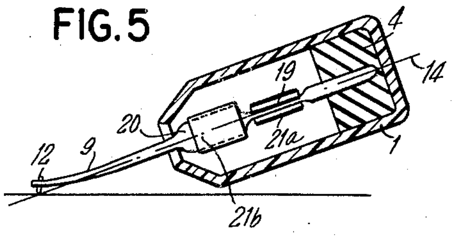
FIG. 5 is a vertical and partly sectional view of another pickup according to the invention in which electrostrictive transducer elements are mounted directly on the rod-shaped stylus arm.

The stereophonic pickup shown in FIG. 5 is provided with an elongated rod-shaped stylus arm whose rear end is elastically mounted in a bearing member 4 enclosed within the housing 1 of the pickup. The stylus arm 9 is flattened in two places 19 and 20. The flattened portions 19 and 20 extend perpendicularly to each other. Respective electrostrictive transducer elements 21*a* and 21*b* are cemented to the arm on both sides of each flat portion in face-to-face contact therewith. In each flat portion 19, 20 the stylus arm has slight resistance to bending in a direction perpendicular to the plane of the transducer elements cemented to these portions. When each flat portion is subjected to bending deformation due to deflection of the stylus 12, the transducer element cemented to that portion is subjected to electrostrictive action.

The particular orientation of the flat portions in FIG. 5 is such that the pickup is particularly suitable for response to stereophonic recordings whose two sound tracks have vertical and lateral undulations respectively. When the stylus 12 is vertically deflected in response to the up-and-down undulations of the sound track on the groove bottom, the arm 9 bends predominantly at its rear flat portion 19 so that only the transducer elements **21*a* on portion 19 produce an appreciable amount of voltage. However, when the stylus 12 is laterally deflected by the lateral undulations of the other sound track, then the stylus arm 9 bends predominantly at its forward flat portion 20 so that only the transducer elements 21*b* produce appreciable voltage. It will be noted that the stylus tip in such a pickup remains deflectable in all directions of a plane perpendicular to the longitudinal symmetry axis 14. It will be understood that the two transducer elements 21*a* are electrically connected in series so that the respective voltages are additive, the same being applicable to the two transducer elements 21*b*** which form the other channel of the stereophonic pickup. The pickup combines a particularly simple design with good separation, i.e. prevention of cross-talk between the two channels.

Figure 6:
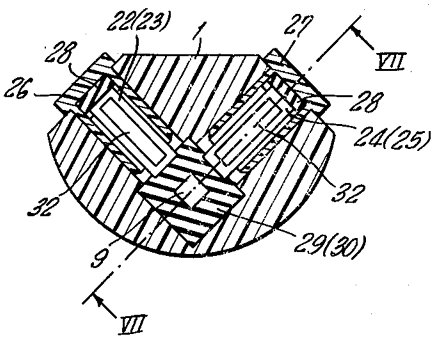
FIGS. 6 and 7 illustrate a third embodiment of a pickup according to the invention, FIG. 6 being a cross section along the line VI—VI indicated in FIG. 7, and FIG. 7 being a longitudinal section along the line VII—VII in FIG. 6.
Figure 7:
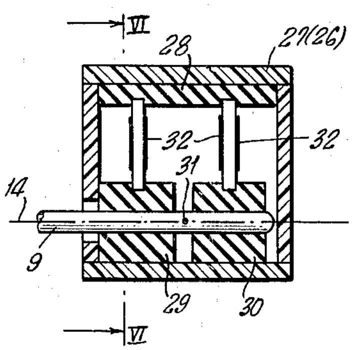

The stereophonic pickup shown in FIGS. 6 and 7 is provided with four electrostrictive transducer elements of the longitudinal-oscillator type. The longitudinal oscillators, denoted by 22 to 25, are arranged in two pairs. The two individual elements of each pair extend parallel to each other in a single plane which is inclined 45° to the horizontal. The two elements of each pair are mounted in a sleeve member 26 or 27 frictionally stuck into a corresponding hole of the insulating housing or supporting structure 1 of the pickup. The elements are attached to an elastic holder 28. They cannot appreciably yield in their longitudinal direction but can be deflected laterally. The sleeves 26, 27 are so mounted in housing 1 that the free ends of the longitudinal oscillators 22 to 25 are pressed into elastic bearing grommets 29 and 30. Consequently, the longitudinal oscillators are pre-stressed in an active position.

The stylus arm 9 is designed essentially as described with reference to FIGS. 1 and 2 and is exchangeably held by friction in both elastic grommets 29 and 30. As a result, the stylus arm 9 can be angularly deflected relatively to the pickup housing about a universal pivot center 31 located between the two grommets. Located on each axial side of the pivot center 31 is one longitudinal oscillator 23 in sleeve 26 and one longitudinal oscillator 25 in sleeve 27. Located on the other axial side of the pivot center are the other oscillator 22 in sleeve 26 and the other oscillator 24 in sleeve 27. The axial spacing of the oscillators from the pivot center is substantially equal.

The sleeves 26 and 27 are so oriented relative to housing 1 that the directions of main orientation of both pairs of transducers are perpendicular to each other and intersect the horizontal surface of the tone carrier at an angle of 45°.

When the stylus of arm 9 deflects in the longitudinal direction of the sleeve 26 (FIG. 6), the longitudinal pressure upon the forward oscillator 22 is increased, whereas the oscillator 23 at the rear is relieved of some of its compressing tension. Both oscillators produce voltages in push-pull relation to each other. These voltages are taken off by means of electrode coatings 32 mounted upon the longitudinal oscillators. The two voltages of oscillators 22 and 23 are connected in one of the output channels in voltage-cumulative relation to each other. The same applies analogously to the two other oscillators in the second channel. Under these conditions the two oscillators of sleeve 27 respond to the above-mentioned motion of the stylus only by deflecting laterally about the elastic mounting structure 28 so that they do not generate appreciable voltage. However, when the stylus moves in the longitudinal direction of the sleeve 27, the operation of the transducer pairs is just the opposite. That is, in this case the transducers of sleeve 27 are axially stressed and produce pickup voltage, whereas the two other transducers deflect and remain electrically inactive.

Figure 8:
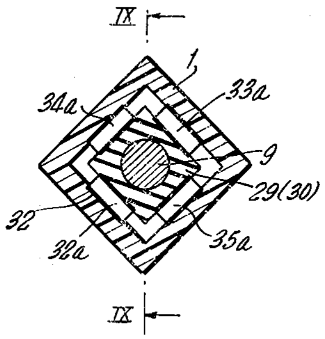
Figure 9:
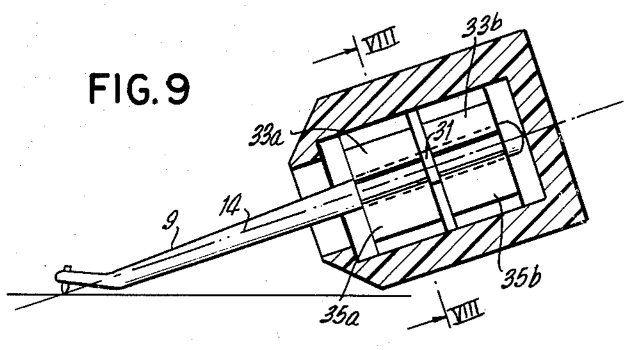

The pickup according to FIGS. 8 and 9 is also provided with longitudinal oscillators for stereophonic reproduction. The stylus arm 9 is mounted in elastic bearing members 29, 30 so as to be deflectable about an intermediate pivot center point located approximately at the point denoted by 31 in FIG. 9. The mounting of the arm in the two bearing members is frictional so that the arm can readily be plugged-in or pulled out axially. Two groups of electrostrictive transducers are provided, each comprising four longitudinal oscillators **32*a*, 33*a*, 34*a*, 35*a* and 32*b*, 33*b*, 34*b*, 35*b*, the elements of each group being symmetrically distributed about the axis 14 of the bearing members. Each two oscillators within the same group are diametrically opposite each other. One group, comprising the oscillators 32*a*, 33*a*, 34*a*, 35*a*, is disposed on one side of the bearing center 31. The other group of oscillators 32*b*, 33*b*, 34*b*, 35*b* is located on the opposite side of the bearing center. Each two oscillators of a group, namely the two located opposite each other, have the same main orientation. The oscillators are braced on one side against the housing 1 of the pickup and on the other side are pressed against the elastic bearing members 29 and 30 of the stylus arm 9**.

During deflection of the stylus arm caused by response of the stylus to the sound tracks, each two of the transducer elements are more strongly stressed while simultaneously two others are relieved, thus producing respective voltages that are proportional to the increase and decrease in stress respectively. These four transducer elements form part of one output channel; that is, they are all electrically connected in series with the poling required for additive relation of the respective voltages. Under the action just considered, those longitudinal oscillators that are parallel to the deflection of the stylus do not produce voltage. Such action, requiring voltage-output electrodes to be mounted on the areas being stressed, is called the "1–1 effect." In the embodiment described above with reference to FIG. 5, the electrode coatings are placed upon the longitudinal oscillators in parallel to the direction of actuating pressure, this action being called the "1–2 effect."

In embodiments of the type described above with reference to FIGS. 6 to 9, the number of oscillators can be varied. For example, in the pickups according to FIGS. 6 and 7 it suffices to provide only the two oscillators 22 and 24, namely those located in the front portion of the respective sleeves 26 and 27. In the embodiment according to FIGS. 8 and 9, the desired stereophonic reproduction can be obtained if only two longitudinal oscillators of different main orientation are provided in the forward group 33. Of course, for monophonic reproduction only one transducer element will be sufficient. However, the embodiments described above and shown on the drawing represent preferred forms of the invention because they afford obtaining a higher output voltage without appreciable increase in space requirements and are applicable for stereophonic as well as monophonic reproduction.

It will be understood that the invention is not limited to the particular embodiments illustrated and described herein, because various changes as to details will be readily available to those skilled in the art, upon a study of this disclosure, without departing from the essential features of my invention and within the scope of the claims annexed hereto. For example the main orientations of the transducers need not necessarily be relatively displaced 90°, but may be otherwise angularly related. The words angularly related are used herein in their ordinary sense as excluding parallel lines which are not normally regarded as angularly related. It will further be understood that pickups according to the invention are applicable for response to single-track grooves of the lateral type, or to stereo records with both tracks on the respective groove walls, or to stereo recordings with two lateral tracks, it being in each case necessary to have the main orientation of the transducers extend in the proper directions.

I claim:

1. A phonograph pickup for grooved records, comprising a mounting structure, a body of resilient material mounted in said structure and having a straight opening, an elongated rod-shaped substantially rigid stylus member having one end firmly seated in said opening and having a stylus rigidly secured to the other end, said member being straight and symmetrical to the axis of said opening over a major portion of the length of said member inclusive of said seated end, said stylus being angularly and universally deflectable together with said member relative to said structure about a center and in all directions of a plane perpendicular to said axis, and transducers mechanically linked with said member at a location close to the center of angular deflection and remote from said stylus to be actuated by step-down leverage, said transducers having respective main orientations each extending at a right angle to the other and at a right angle to said axis.

2. In a pickup according to claim 1, said transducer means each comprising the same number of individual transducer elements, the elements of each transducer means having respective main orientations perpendicular to those of the other group.

3. In a pickup according to claim 1, said plurality of transducer means being two in number each transducer means comprising a group of electrostrictive transducer elements forming longitudinal oscillators, each group having a main orientation perpendicular to that of the elements in the other group, and coupling means of elastic material mechanically joining both groups of transducer elements with said pickup member.

4. In a pickup according to claim 1, said mounting structure having pivot means of elastic material in which said one end of said stylus member is seated, said pivot means forming a center for said angular stylus deflections, said transducer means each comprising two electrostrictive transducer elements having respective main orientations parallel to each other, said two transducer elements being joined with said pickup member on opposite axial sides respectively of said pivot center.

5. In a pickup according to claim 1, said mounting structure having pivot means of elastic material in which said one end of said stylus member is seated, said pivot means forming a center for said angular stylus deflections, said plurality of transducer means comprising two pairs of electrostrictive transducer elements, the two elements of each pair being disposed at an angle of about 90° to each other in a plane perpendicular to the axis of said pickup member, said two pairs of transducer elements being joined with said pickup member on opposite axial sides respectively of said pivot center.

6. In a pickup according to claim 1, said mounting structure having pivot means of elastic material in which said one end of said stylus member is seated, said pivot means forming a center for said angular stylus deflections, said plurality of transducer means being two in number, each transducer means comprising two groups of electrostrictive transducer elements, each group having four such elements whose main orientations are perpendicular to said axis of said pickup member and uniformly distributed symmetrically about said axis, said two groups of transducer elements being joined with said pickup member on opposite axial sides respectively of said pivot center, each two transducer elements of said respective two groups being diametrically opposite two other ones of said elements.

7. A phonograph pickup for grooved records, comprising a mounting structure, a body of resilient material mounted in said structure and having a straight opening, an elongated rod-shaped substantially rigid stylus member having one end firmly seated in said opening and having a stylus rigidly secured to the other end, said member being straight and symmetrical to the axis of said opening over a major portion of the length of said member inclusive of said seated end, said opening being axially short in comparison with said length whereby said resilient body forms a universal pivot center about which said stylus is angularly and universally deflectable relative to said structure in all directions of a plane perpendicular to said axis, transducers mounted on said structure and having respective main orientations extending at a right angle to each other and at a right angle to said axis, and mechanical coupling means connecting said transducers with said member at a location closer to said pivot center than to said stylus for actuation of said transducers by step-down leverage.

8. A phonograph pickup for grooved records, comprising a mounting structure having frictional fastening means with a straight opening, an elongated rod-shaped substantially rigid stylus arm member having one end which forms a plug frictionally seated in said opening to be axially removable therefrom, a stylus rigidly secured to said member at the other end thereof, said member being straight and symmetrical to the axis of said opening over a major portion of the length of said member inclusive of said seated end, said stylus being angularly and universally deflectable relative to said structure in all directions of a plane perpendicular to said axis, axially parallel piezoelectric transducers mechanically linked with said member at a location close to the center of angular deflection than said stylus end thereof so as to be actuated by step-down leverage, said transducers having respective main orientations extending at a right angle to each other and at a right angle to said axis.

9. A phonograph pickup for grooved records, comprising a mounting structure, a body of resilient material mounted in said structure and having a straight opening, an elongated rod-shaped stylus member having one end firmly seated in said opening and having a stylus rigidly secured to the other end, said member being straight and symmetrical to the axis of said opening over a major portion of the length of said member inclusive of said seated end, and having a taper at said other end, said other end extending upwardly away from said axis with the tip of said stylus located substantially on said axis, said opening being axially short in comparison with said length whereby said resilient body forms a universal pivot center about which said stylus is deflectable relative to said structure in all directions of a plane perpendicular to said axis, two flat and elongated electrostrictive transducers extending parallel to said axis and inclined about 90° to each other and about 45° to the horizontal, said two transducers having one end mounted on said structure remote from said resilient body, and a coupler mechanically joined with said member at a point closer to said resilient body than to said stylus and engaging the respective other ends of said two transducers for subjecting them to bending in response to deflecting motion of said stylus.

10. In a pickup according to claim 9, said mounting structure having a cavity axially behind said resilient body, said seated end of said pickup member extending through said opening of said body into said chamber, and fluid damping substance in said chamber.

11. In a pickup according to claim 9, said coupler consisting of a plate extending at a right angle to said axis and having an opening traversed by said pickup member and two elongated symmetrical slots at a right angle to each other and engaged by said other ends of said respective transducers.

12. Phonograph pickup for grooved records, comprising a mounting structure, a body of resilient material mounted in said structure and having a straight opening, an elongated rod-shaped substantially rigid stylus member having one end firmly seated in said opening and having a stylus rigidly secured to the other end, said member being straight and symmetrical to the axis of said opening over a major portion of the length of said member inclusive of said seated end, said opening being axially short in comparison with said length whereby said resilient body forms a universal pivot center about which said stylus is angularly and universally deflectable relative to said structure in all directions of a plane perpendicular to said axis, two strip-shaped electrostrictive transducer units extending parallel to said axis in respective planes inclined at about a right angle to each other, said two transducer units having respective main orientations at a right angle to said axis, mechanical coupling means connecting said transducers with said member at a location closer to said pivot center than to said stylus for actuation of said transducers by step-down leverage, each of said two transducer units having one end engaged by said coupling means and having its other end secured to said structure at the side of said coupling means facing away from said stylus.

13. A phonograph pickup for grooved records, comprising a mounting structure, an elongated rod-shaped substantially rigid stylus member having one holding end and having a stylus secured on the other end, said member being straight and symmetrical to its longitudinal axis over the predominant portion of its length including said holding end, elastic mounting means for attaching said stylus member to said mounting structure so that said member is angularly and universally deflectable relative to said structure about a center of angular deflection near said holding end of said member and in all directions of a plane through said stylus perpendicular to the normal position of the longitudinal axis, and a plurality of transducers coupled with said member at a location closer to the center of angular deflection than said stylus so as to be actuated by step-down leverage, said transducers having respective main orientations angularly related to each other in a plane perpendicular to said axis.

14. A phonograph pickup for grooved records, comprising a mounting structure, at least one body of resilient material mounted in said structure and having a straight opening, an elongated rod-shaped substantially rigid stylus member having one end passing through said opening, said stylus member being firmly seated in said opening near said one end and having a stylus rigidly secured to the other end, said member being straight and symmetrical to the axis of said opening over a major portion of the length of said member inclusive of said seated end, said stylus member being angularly and universally deflectable in all directions about a center of deflection near said one end, and transducers coupled with said member at a location in close proximity to said center of deflection and actuated by the part of said stylus member between the coupling area and said center of deflection as a very short lever in comparison with the extent of said stylus member between said stylus and said center of deflection as a long lever, said transducers being mainly oriented at substantially right angles to each other and having their uncoupled ends affixed to said mounting structure in an area substantially remote from said center of deflection.

References Cited by the Examiner

UNITED STATES PATENTS

| | | | |
|---|---|---|---|
| 2,496,484 | 2/50 | Massa | 179—100.41 |
| 2,775,460 | 12/56 | Shivack | 179—100.41 |
| 2,840,644 | 6/58 | Klingener | 179—100.41 |
| 2,847,588 | 8/58 | Herbert | 179—100.41 X |
| 2,934,610 | 4/60 | Dieter | 179—100.41 |
| 2,955,216 | 10/60 | Dieter | 179—100.41 |

FOREIGN PATENTS 686,777 1/53 Great Britain.

OTHER REFERENCES

German application T 11,092, Batsch, Dec. 13, 1962.

IRVING L. SRAGOW, *Primary Examiner.*

ROBERT H. ROSE, JOHN P. WILDMAN, BERNARD KONICK, L. MILLER ANDRUS, *Examiners.*